(12) United States Patent
Iorga et al.

(10) Patent No.: US 11,824,774 B2
(45) Date of Patent: Nov. 21, 2023

(54) METHOD FOR REDUCING THE NUMBER OF IP ADDRESSES USED WHEN CREATING A VIRTUAL ROUTER

(71) Applicant: Lenovo Global Technology (United States) Inc., Morrisville, NC (US)

(72) Inventors: Radu Mihai Iorga, Bucharest (RO); Corneliu-Ilie Calciu, Bucharest (RO); George-Andrei Stanescu, Ilfov (RO)

(73) Assignee: Lenovo Global Technology (United States) Inc., Morrisville, NC (US)

( * ) Notice: Subject to any disclaimer, the term of this patent is extended or adjusted under 35 U.S.C. 154(b) by 178 days.

(21) Appl. No.: 17/667,386

(22) Filed: Feb. 8, 2022

(65) Prior Publication Data
US 2023/0254247 A1 Aug. 10, 2023

(51) Int. Cl.
*H04L 45/586* (2022.01)
*H04L 45/52* (2022.01)
*H04L 45/741* (2022.01)

(52) U.S. Cl.
CPC .......... *H04L 45/586* (2013.01); *H04L 45/52* (2013.01); *H04L 45/741* (2013.01)

(58) Field of Classification Search
CPC ...... H04L 45/586; H04L 45/52; H04L 45/741
USPC ....................................................... 709/238
See application file for complete search history.

(56) References Cited

U.S. PATENT DOCUMENTS

| 2017/0005915 A1* | 1/2017 | Mirsky | ............... H04L 45/28 |
| 2017/0359247 A1* | 12/2017 | Dixon | ............... H04L 45/123 |
| 2018/0359215 A1* | 12/2018 | Khare | ............... H04L 49/70 |
| 2020/0137093 A1* | 4/2020 | Janakiraman | ....... H04L 63/0263 |

OTHER PUBLICATIONS

Huawei, "Different Subnet for Virtual IP in VRRP", Knowledge Base, Jul. 11, 2019, pp. 1-5.

* cited by examiner

*Primary Examiner* — Hermon Asres
(74) *Attorney, Agent, or Firm* — Kunzler Bean & Adamson; Bruce R. Needham

(57) ABSTRACT

A method for reducing the number of IP addresses used by VRRP includes creating a VRRP control packet at a router of a plurality of physical routers configured in parallel in a data pathway. The physical routers are configured as a virtual router and the VRRP control packet is configured as an IPv6 control packet. The method includes inserting an IP address of the virtual router in a router address field of a control packet header. The IP address is formatted as an IPv4 address. The method includes inserting, in a reserved field of the control packet, a first value. The first value differs from a default value for the reserved field signifying that IP addresses in the router address field are formatted as IPv6 addresses for IPv6 control packets and the first value signifies that the IP addresses in the router address field are formatted as IPv4 addresses.

20 Claims, 5 Drawing Sheets

METHOD FOR REDUCING THE NUMBER OF IP ADDRESSES USED WHEN CREATING A VIRTUAL ROUTER

FIELD

The subject matter disclosed herein relates to virtual routers and more particularly relates to reducing the number of IP addresses used when creating a virtual router.

BACKGROUND

The Virtual Router Redundancy Protocol (VRRP) is a network protocol that specifies an election process that dynamically assigns responsibility for a virtual router to one of the VRRP routers on a local area network ("LAN"). Virtual routers are useful for increasing availability and reliability of routing paths. Virtual routers are achieved by having multiple physical routers be part of a same group and acting as a single virtual router. The virtual router is then configured, instead of the physical routers, as the default gateway/next-hop for the participating hosts.

BRIEF SUMMARY

A method for reducing the number of IP addresses used by VRRP includes creating a VRRP control packet at a router of a plurality of physical routers configured in parallel in a data pathway. The plurality of physical routers are configured as a virtual router and the VRRP control packet is configured as an Internet Protocol ("IP") version 6 ("IPv6") VRRP control packet. The method includes inserting an IP address of the virtual router in a router address field of a header of the VRRP control packet. The IP address is formatted as an IP version 4 ("IPv4") address. The method includes inserting a first value in a reserved field of the VRRP control packet. The first value differs from a second value designated as a default value for the reserved field. The default value signifies that IP addresses in the router address field are formatted as IPv6 addresses for IPv6 VRRP control packets and the first value signifies that the IP addresses in the router address field are formatted as IPv4 addresses.

An apparatus for reducing the number of IP addresses used by VRRP includes a processor and a memory storing code. The code is executable by the processor to perform operations that include creating a VRRP control packet at a router of a plurality of physical routers configured in parallel in a data pathway. The plurality of physical routers are configured as a virtual router and the VRRP control packet is configured as an IPv6 VRRP control packet. The operations include inserting an IP address of the virtual router in a router address field of a header of the VRRP control packet, where the IP address is formatted as an IPv4 address, and the operations include inserting a first value in a reserved field of the VRRP control packet. The first value differs from a second value designated as a default value for the reserved field. The default value signifies that IP addresses in the router address field are formatted as IPv6 addresses for IPv6 VRRP control packets and the first value signifies that the IP addresses in the router address field are formatted as IPv4 addresses.

A program product for reducing the number of IP addresses used by VRRP includes a non-volatile computer readable storage medium storing code. The code is configured to be executable by a processor to perform operations that include creating a VRRP control packet at a router of a plurality of physical routers configured in parallel in a data pathway. The plurality of physical routers are configured as a virtual router and the VRRP control packet is configured as an IPv6 VRRP control packet. The operations include inserting an IP address of the virtual router in a router address field of a header of the VRRP control packet, where the IP address is formatted as an IPv4 address, and inserting a first value in a reserved field of the VRRP control packet. The first value differs from a second value designated as a default value for the reserved field. The default value signifies that IP addresses in the router address field are formatted as IPv6 addresses for IPv6 VRRP control packets and the first value signifies that the IP addresses in the router address field are formatted as IPv4 addresses.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
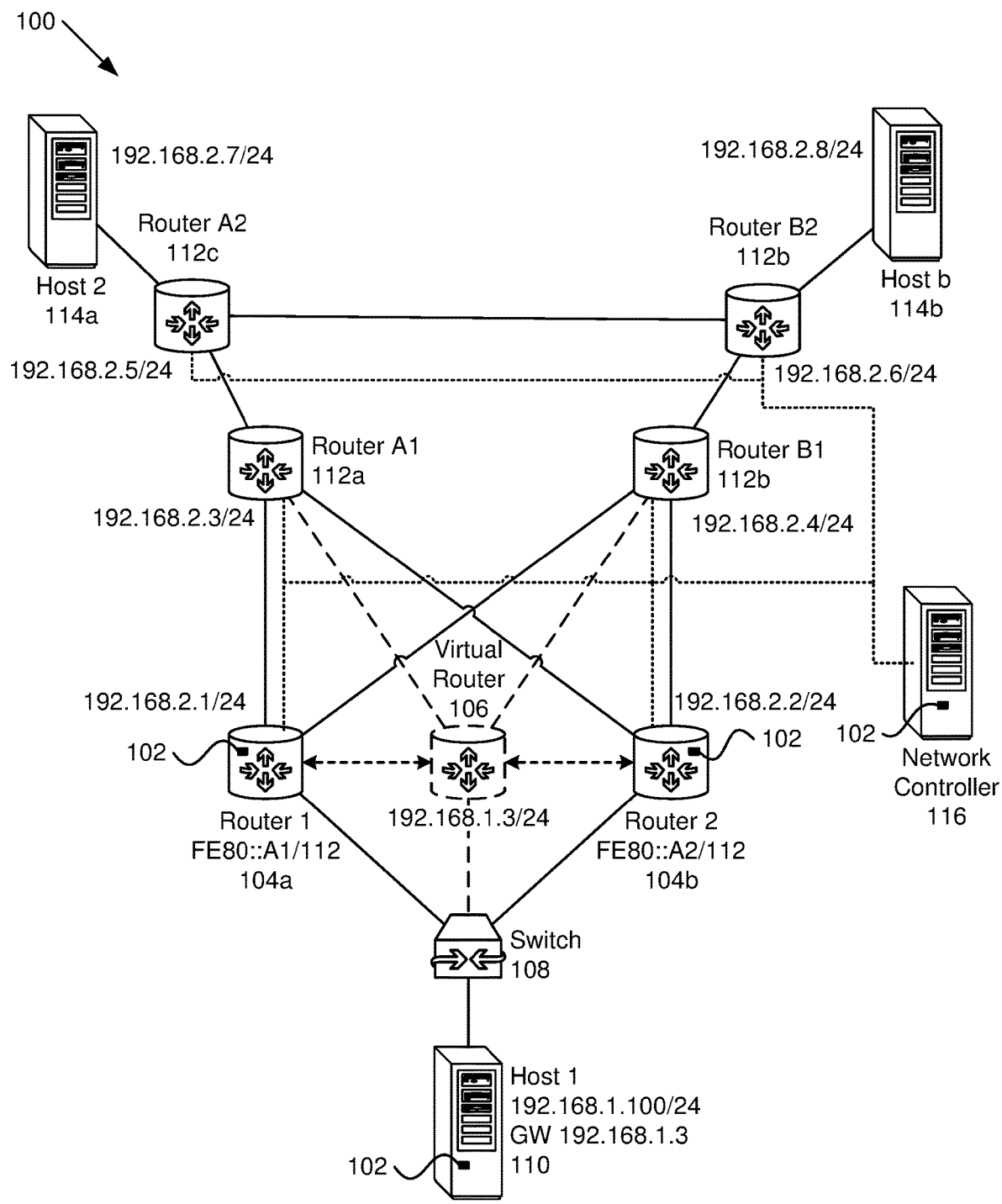
FIG. 1 is a schematic block diagram illustrating a computer network for reducing the number of IP addresses used by VRRP, according to various embodiments.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In certain embodiments, the storage devices only employ signals for accessing code.

Many of the functional units described in this specification have been labeled as modules, in order to more particularly emphasize their implementation independence. For example, a module may be implemented as a hardware circuit comprising custom very large scale integrated ("VLSI") circuits or gate arrays, off-the-shelf semiconductors such as logic chips, transistors, or other discrete components. A module may also be implemented in programmable hardware devices such as a field programmable gate array ("FPGA"), programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or "Flash memory"), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, R, Java, Java Script, Smalltalk, C++, C sharp, Lisp, Clojure, PHP, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of some embodiments.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of various embodiments. For instance, an arrow may indicate a waiting or monitoring period of unspecified duration between enumerated steps of the depicted embodiments. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C.

A method for reducing the number of IP addresses used by VRRP includes creating a VRRP control packet at a router of a plurality of physical routers configured in parallel in a data pathway. The plurality of physical routers are configured as a virtual router and the VRRP control packet is configured as an IPv6 VRRP control packet. The method includes inserting an IP address of the virtual router in a router address field of a header of the VRRP control packet. The IP address is formatted as an IPv4 address. The method includes inserting a first value in a reserved field of the VRRP control packet. The first value differs from a second value designated as a default value for the reserved field. The default value signifies that IP addresses in the router address field are formatted as IPv6 addresses for IPv6 VRRP control packets and the first value signifies that the IP addresses in the router address field are formatted as IPv4 addresses.

In some embodiments, the method includes creating a VRRP control packet at each router of the plurality of physical routers. Each VRRP control packet includes the IP address of the virtual router in the router address field and the first value in the reserved field of the header. Each router of the plurality of physical routers transmits the VRRP control packet of the router to directly connected routers of the plurality of physical routers of the virtual router. In other embodiments, transmitting the VRRP control packet to an adjacent router of the plurality of physical routers forming the virtual router includes retransmitting the VRRP control packet periodically. In other embodiments, the router of the plurality of physical routers reads the IP address of the virtual router in the router address field as an IPv4 address in response to the reserved field including the first value.

In some embodiments, each router of the plurality of physical routers has an IPv6 address. In other embodiments, each router of the plurality of physical routers and the virtual router are in a same subnet. In other embodiments, the second value is a logic 0 for each bit in the reserved field and the first value has a logic 1 for at least one bit in the reserved field. In other embodiments, a router of the plurality of physical routers transmits the VRRP control packet to each directly connected router using a link-local address. In other embodiments, each of the plurality of physical routers are not assigned an IP address.

An apparatus for reducing the number of IP addresses used by VRRP includes a processor and a memory storing code. The code is executable by the processor to perform operations that include creating a VRRP control packet at a router of a plurality of physical routers configured in parallel in a data pathway. The plurality of physical routers are configured as a virtual router and the VRRP control packet is configured as an IPv6 VRRP control packet. The operations include inserting an IP address of the virtual router in a router address field of a header of the VRRP control packet, where the IP address is formatted as an IPv4 address, and the operations include inserting a first value in a reserved field of the VRRP control packet. The first value differs from a second value designated as a default value for the reserved field. The default value signifies that IP addresses in the router address field are formatted as IPv6 addresses for IPv6 VRRP control packets and the first value signifies that the IP addresses in the router address field are formatted as IPv4 addresses.

In some embodiments, operations include creating a VRRP control packet at each router of the plurality of physical routers. Each VRRP control packet includes the IP address of the virtual router in the router address field and the first value in the reserved field of the header. Each router of the plurality of physical routers transmits the VRRP control packet of the router to directly connected routers of the plurality of physical routers of the virtual router. In other embodiments, the router of the plurality of physical routers reads the IP address of the virtual router in the router address field as an IPv4 address in response to the reserved field including the first value. In other embodiments, each router of the plurality of physical routers has an IPv6 address and each router of the plurality of physical routers and the virtual router are in a same subnet.

In some embodiments, transmitting the VRRP control packet to an adjacent router of the plurality of physical routers forming the virtual router includes retransmitting the VRRP control packet periodically. In other embodiments, the second value includes a logic 0 for each bit in the reserved field and the first value includes a logic 1 for at least one bit in the reserved field. In other embodiments, a router of the plurality of physical routers transmits the VRRP control packet to each directly connected router using a link-local address. In other embodiments, each of the plurality of physical routers are not assigned an IP address.

A program product for reducing the number of IP addresses used by VRRP includes a non-volatile computer readable storage medium storing code. The code is configured to be executable by a processor to perform operations that include creating a VRRP control packet at a router of a plurality of physical routers configured in parallel in a data pathway. The plurality of physical routers are configured as a virtual router and the VRRP control packet is configured as an IPv6 VRRP control packet. The operations include inserting an IP address of the virtual router in a router address field of a header of the VRRP control packet, where the IP address is formatted as an IPv4 address, and inserting a first value in a reserved field of the VRRP control packet. The first value differs from a second value designated as a default value for the reserved field. The default value signifies that IP addresses in the router address field are formatted as IPv6 addresses for IPv6 VRRP control packets and the first value signifies that the IP addresses in the router address field are formatted as IPv4 addresses.

In some embodiments, the code is further configured to be executable by a processor to perform operations that include creating a VRRP control packet at each router of the plurality of physical routers. Each VRRP control packet includes the IP address of the virtual router in the router address field and the first value in the reserved field of the header. Each router of the plurality of physical routers transmits the VRRP control packet of the router to directly connected routers of the plurality of physical routers of the virtual router. In other embodiments, the router of the plurality of physical routers reads the IP address of the virtual router in the router address field as an IPv4 address in response to the reserved field including the first value.

FIG. 1 is a schematic block diagram illustrating a computer network 100 for reducing the number of IP addresses used by VRRP, according to various embodiments. The computer network 100 includes a virtual router apparatus 102, in physical routers 104a, 104b (generically or collectively "104") of a virtual router 106, a switch 108, a first host 110, additional routers 112a, 112b, 112c, 112d (generically or collectively "112"), additional hosts 114a, 114b (generically or collectively "114"), and a network controller 116, which are described below.

The virtual router apparatus 102, in some embodiments, is located in physical routers 104 that are configured as a virtual router 106 of the computer network 100 acting as a gateway for a first host 110. In other embodiments, all or a portion of the virtual router apparatus 102 is located in the first host 110. In other embodiments, all or a portion of the virtual router apparatus 102 is located in the network controller 106. The virtual router 106 is configured using a Virtual Router Redundancy Protocol ("VRRP") where the virtual router 106 is assigned an IP address using the IP version 4 ("IPv4") format. The virtual router apparatus 102 uses VRRP control packets configured as IP version 6 ("IPv6") packets so that the physical routers 104 do not use additional IP addresses that are IPv4 addresses, which advantageously reduces the number of IPv4 addresses used for a virtual router. The virtual router apparatus 102 is described in more detail with regards to the apparatus 200 of FIG. 2.

The computer network 100 includes a switch 108 connected between the physical routers 104 and the first host 110. In some embodiments, the physical routers 104 of the virtual router 106 connect to two or more switches 108, which connect various components of a network and connect other computing devices in addition to the first host 110, such as printers, servers, data storage devices, etc. The computer network 100 depicts a single switch 108 and first host 110 to represent other typical computing equipment in a network where the virtual router 106 serves as a gateway to other networks. The additional routers 112 and the additional hosts 114 represent possible destinations and components in a data pathway for data packets passing through the physical routers 104.

Typically, data packets pass through or are controlled by a host, such as the first host 110. The host controls data transmission to additional hosts 114 in another network. In some embodiments, the host serves as a source for data packets being transmitted to another host 114 so that an IP layer of a data packet includes an IP address of the host in a source field along with an IP address of the destination. Between the source and the destination is a data pathway that includes the virtual router 106. The physical routers 104 that make up the virtual router 106 are in parallel and provide redundancy and/or increased data transmission capacity.

Computing devices such as the first host 110 or other hosts using the virtual router 106 as a gateway direct traffic to the virtual router 106 and the Virtual Router Redundancy Protocol ("VRRP") is used to configure the physical routers to handle data traffic addressed to the virtual router 106. VRRP is a protocol that facilitates configuration of two or more routers (e.g. 104) into a virtual router (e.g. 106). While a single virtual router 106 is depicted in the computer network 100, in other embodiments other routers, such as the additional routers 112, are configured as a virtual router. In some embodiments, one physical router (e.g. 104a) is designated as a primary router and one or more other physical routers (e.g. 104b) are designated as backup routers. In other embodiments, VRRP allows the physical routers 104 to share data traffic to increase data traffic capacity. In some embodiments, one or more of the additional routers 112 access a routing table with the IP address of the virtual router 106 included and data packets addressed to the virtual router 106 are handled by VRRP to direct the packets though a physical router 104.

The switch 108 facilitates sharing of computing resources by connecting together the computing resources. The computing resources may include servers, data storage devices, printers, and the like. The physical routers 104 are capable of connecting multiple devices, such as the switch 108 and additional routers 112 but also include a capability to be a gateway between networks or subnets. The physical routers 104 and additional routers 112 typically have access to a routing table, which facilitates routing of a data packet from a source to a destination. The routing table includes information about connections between devices and associated IP addresses of the devices.

In some embodiments, a host, such as the first host 110, controls the switch 108. In other embodiments some data packets go through a computing device connected to the switch 108 other than the first host 110, such as another host configured with the virtual router 106 as a gateway. In the embodiments shown, the switch 108 does not include an IP address. In other embodiments, the switch 108 has an IP address, which may be used to manage the switch 108. The first host 110, switch 108, and other computing devices along with the physical routers 104 and associated virtual router 106 are on a same network or subnet, which often uses IPv4 addresses. The IPv4 address space for a network is very limited compared with the IPv6 address space. However, IPv4 addresses are in wide use and are typically used for small networks as well as networks with equipment in a datacenter.

Current virtual routers configured using VRRP typically require an IP address for each physical router of a virtual router as well as an IP address for the virtual router itself. Where there are several virtual routers in a network, the virtual routers and accompanying physical routers take up a quite a few IP addresses of the IPv4 address space, which is undesirable. VRRP typically requires the physical routers 104 and the virtual router 106 to be within the same subnet.

A network may be divided into a subnet where some of the bits of the IP address are designated as an identifier for the network and other bits are used to identify a particular device in the subnet. A subnet is typically identified using a subnet mask or netmask. An IPv4 IP address includes four groups of 8 bits (an octet) divided by a period. For example, the IP address of the first host 110 is 192.168.1.100/24 where the "192.168.1" identifies the network and the "100" is the identifier ("ID") for the first host 110. The "/24" is the subnet mask. The subnet mask indicates which bits of the IP address are for identifying the network and which bits are used to identify a particular computing device in the network.

A subnet mask may be expressed as a set of four octets, such as 255.255.255.0. In the subnet mask 255.255.255.0, each 255 represents 11111111 in binary format so that 255.255.255.0 would represent 11111111.11111111.11111111.00000000, which signifies that the first 32 bits are part of the network address and the last 8 bits are used to identify a computing device. Another notation for a subnet mask is the Classless Inter-Domain Routing ("CIDR") notation. The "/24" in the IP addresses of the computing computer network 100 of FIG. 1 is a subnet mask in CIDR notation, which is equal to 255.255.255.0 and indicates that the first 24 bits the IP address represent the network address so that the last 8 bits are for the identifier of the computing device. For a subnet of/24, the last 8 bits can represent up to 255 devices with a number range of 0 to 254.

The virtual router 106 has an IP address in IPv4 format of 192.168.1.3/24 and the first host 110 has an IP address, again in IPv4 format, of 192.168.1.100/24 so that the network ID is 192.168.1 and the "3" and "100" are identifiers for the virtual router 106 and first host 110 respectively. The physical routers 104 are a gateway between the 192.168.1 network and the 192.168.2 network so that the first physical router 104a has a second IP address of 192.168.2.1/24 and the second physical router 104b has a second IP address of 192.168.2.2/24. The additional routers 112a-112d and the additional hosts 114a, 114b each have an IP address of the second network which includes 192.168.2 plus the device number. Note that the physical routers 104a and 104b each has an IPv6 address.

The first physical router 104a has an IP address in IPv6 format of FE80::A1/112 and the second physical router 104b has an IP address in IPv6 format of FE80::A2/112. The IPv6 addresses before the prefix of FE80::A1 and FE80::A2 are written in condensed notation. For example, FE80::A1 and can be expressed in expanded notation as FE80:0000:0000:0000:0000:0000:0000:00A1. Each has a prefix length (which may also be called a subnet mask or netmask) of 112. Typical prefix lengths for IPv6 may be between 1 and 128. However, the prefix lengths for the physical routers 104 is limited to between 10 and 127, as explained below. A prefix length of 112 means that the first 112 bits are for the network address and the last 16 bits are for device identifiers. In embodiments described herein, the physical routers 104a, 104b each has a link-local address, which is described below.

The computer network 100, in some embodiments, includes a network controller 116 configured to control devices of the computer network 100, such as the physical routers 104 and the additional routers 112. In some embodiments, the network controller 116 is connected to the physical routers 104 and the additional routers 112 over a back-channel network. In other embodiments, the network controller 116 is connected to the physical routers 104 and the additional routers 112 over communication pathways between the routers similar to a host 110, 114. One of skill in the art will recognize other ways that the network controller 116 can connect and control network devices such as the physical routers 104 and the additional routers 112.

In some embodiments, the network controller 116 includes all or a portion of the virtual router apparatus 102. For example, the network controller 116 may be used to configure virtual routers 106 in the computer network 100 so that the virtual router apparatus 102 in the network controller 116 is used to configure VRRP control packets in the physical routers 104. In other embodiments, the virtual router apparatus 102 in the physical routers 104 responds to commands from the network controller 116 to configure the virtual router 106 and associated VRRP control packets. One of skill in the art will recognize other ways for the network controller 116 to be involved with the virtual router apparatus 102 to configure the virtual router 106.

Figure 2:
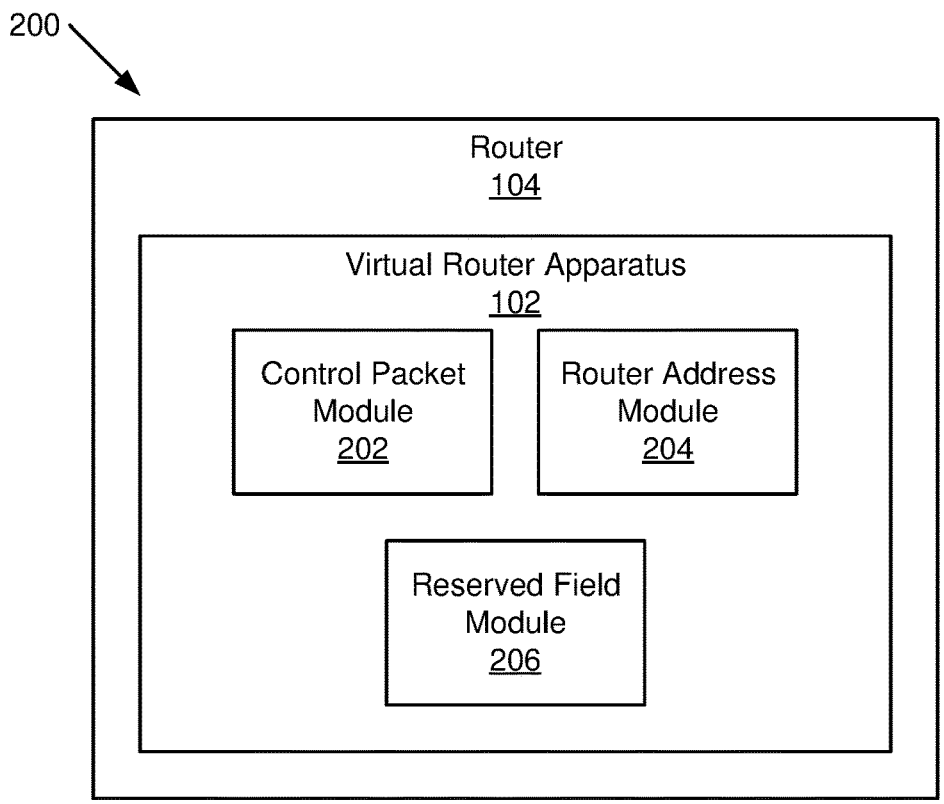
FIG. 2 is a schematic block diagram illustrating an apparatus for reducing the number of IP addresses used by VRRP, according to various embodiments.

FIG. 2 is a schematic block diagram illustrating an apparatus 200 for reducing the number of IP addresses used by VRRP, according to various embodiments. The apparatus 200 includes a virtual router apparatus 102 in a physical router 104 where the virtual router apparatus 102 includes a control packet module 202, a router address module 204, and a reserved field module 206, which are described below. The apparatus 200, in some embodiments, is implemented with code stored on computer readable storage media. In other embodiments, some or all of the apparatus is implemented using hardware circuits and/or a programmable hardware device. In various embodiments, some or all of the apparatus 200 is located in the physical routers 104, a host 110, 114, the network controller 116, a server, or the like. One of skill in the art will recognize other locations where some or all of the apparatus 200 may be located.

The apparatus 200 includes a control packet module 202 configured to create a VRRP control packet at a router (e.g. 104a) of a plurality of physical routers 104 configured in parallel in a data pathway. The plurality of physical routers 104 are configured as a virtual router 106 and the VRRP control packet is configured as an IPv6 VRRP control packet. The VRRP control packet is a control packet transmitted between the physical routers 104 that are included in the virtual router 106. Typically, the VRRP control packets are sent to an adjacent router.

In some embodiments, each physical router 104 transmits the VRRP control packet to each directly connected router using a link-local address, which is a format used for communicating to a directly connected device. For example, the first physical router 104a communicates with the switch 108, the second physical router 104a, a first additional router 112a and a second additional router 112b using a link-local address. In computer networking, a link-local address is a network address that is valid only for communications within the network segment or broadcast domain to which the device is directly connected. Link-local addresses are typically assigned automatically and are not typically unique so that routers do not forward packets with a link-local source or destination address. In some embodiments, the IPv6 address of each physical router 104 is a link-local address. Typically, where a device has a link-local address the prefix length has a range from 10 to 127 with a default value of 10.

Where three physical routers 104 form a virtual router 106 and one of the physical routers (e.g. 104*c*) is in between the other two physical routers 104*a*, 104*b*, the first physical router 104*a* may send a VRRP control packet to the middle physical router 104*c*, the middle physical router 104*c* may send VRRP control packets to the first and second physical routers 104*a*, 104*b* and the second physical router 104*b* may send VRRP control packets to the middle physical router 104*c*.

Typically, VRRP control packets are send between physical routers 104 of a virtual router 106 on a periodic basis. In some embodiments, where VRRP control packets are being received, the physical routers 104 maintain the virtual router 106. Where VRRP control packets are not being received from a physical router (e.g. 104*a*), the other physical router(s) 104*b* remove the virtual router 106 and data packets are directed to the working physical router(s) 104*b*.

Figure 4:
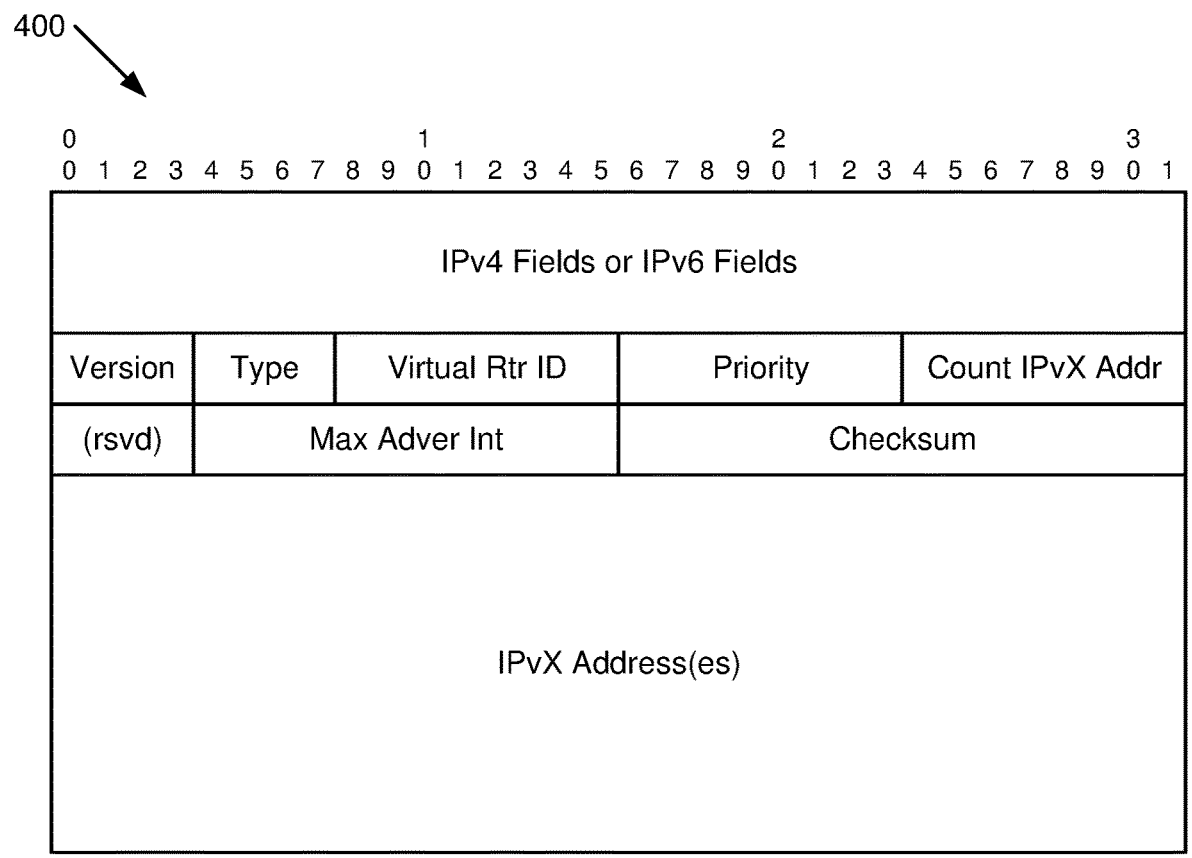
FIG. 4 is a diagram illustrating various of fields of a VRRP header, according to various embodiments.

FIG. 4 is a diagram illustrating fields of a VRRP header 400 which is used for the VRRP control packet, according to various embodiments. The numbers across the top of the VRRP header 400 indicate that there are 32 bits in the VRRP header 400, starting from the left. The first field of the VRRP header 400 includes IPv4 fields if the VRRP control packet is configured as an IPv4 control packet or IPv6 fields if the VRRP control packet is configured as an IPv6 control packet. The IPv4 or IPv6 fields include a source address and a destination address of the packet either formatted as an IPv4 address or as an IPv6 address.

Typically, where an IPv4 address is detected, the VRRP control packet is assumed to be IPv4 and the IPvX addresses (e.g. router address field) at the bottom of the header are read as IPv4 addresses. Likewise, where an IPv6 address is detected, the VRRP control packet is assumed to be IPv6 and the IPvX addresses at the bottom of the header are read as IPv6 addresses. As described below, the reserved field (rsvd) is used to alter this assumption.

The Version field is the version of the VRRP protocol being used. Version 3 is commonly used, but other versions may be used. The Type field is the type of VRRP packet. Currently, the only packet type defined in VRRP version 3 is "advertisement," which means that the VRRP control packet provides information that advertises the information about the virtual router 106. In other embodiments, other VRRP control packet types are used. The Virtual Rtr ID (VRID) field specified the router's priority for the virtual router. The priority has to do with the service level agreement of the router.

The Count IPvX Addr field is the number of IPv4 or IPv6 addresses in the IPvX Address(es) field. The reserved (rsvd) field is a 4-bit field which is typically all zeros, but is modified as explained below. The Maximum Advertisement Interval (Max Adver Int) field is a 12-bit field that indicates a time interval in centiseconds between advertisements, which is the maximum frequency that the VRRP control packet is sent. The default is 100 centiseconds (1 second). If the Max Adver Int field is set to 1 second, then if a VRRP control packet is not received from a physical router (e.g. 104*a*), then the physical router 104*a* is assumed to have failed. The checksum field is a checksum for the VRRP header 400 and is used to verify that the VRRP control packet is intact and correct.

The IPvX Address(es) field includes an IP address for each virtual router that the physical router (e.g. 104*a*) sending the VRRP control packet is part of. The physical routers 104 may be part of various virtual routers 106. For example, each subnet using the physical routers 104 as a gateway may form a virtual router 106 that includes a different IP address for each subnet.

The apparatus 200 includes a router address module 204 configured to insert an IP address of the virtual router in a router address field of a header of the VRRP control packet. The IP address is formatted as an IPv4 address, as will be explained below. In some embodiments, the router address module 204 inserts the IP addresses of multiple virtual routers 106.

The apparatus 200 includes a reserved field module 206 configured to insert a first value in the reserved field of the VRRP header 400 of the VRRP control packet. The first value differs from a second value designated as a default value for the reserved field. The default value signifies that IP addresses in the router address field are formatted as IPv6 addresses and the first value signifies that the IP addresses in the router address field are formatted as IPv4 addresses.

Typically, the second value is the default value of the reserved field and is zero signifying that when the VRRP control packet is an IPv6 packet (e.g. the source and destination addresses in the IPv4 or IPv6 fields at the top are formatted as IPv6 addresses), the physical router 104 receiving the VRRP control packet reads the values in the router address field as IPv6 addresses. Where the reserved field is the first value, typically any value other than zero, an IPv6 VRRP control packet includes IPv4 addresses for the virtual router(s) 106 in the router address field (IPvX address(es) field) and the physical router receiving the VRRP control packet then reads the addresses in the router address field as IPv4 addresses. Thus, the physical routers 104 can have IPv6 IP addresses while the virtual router 106 can be assigned a single IP address that is IPv4. In some embodiments, the second value includes a logic 0 for each bit in the reserved field and the first value includes a logic 1 for at least one bit in the reserved field. For example, the first value may be 0001, 0011, 1111, or any other 4-bit combination with a logic 1 as one of the bits in the reserved field.

Figure 3:
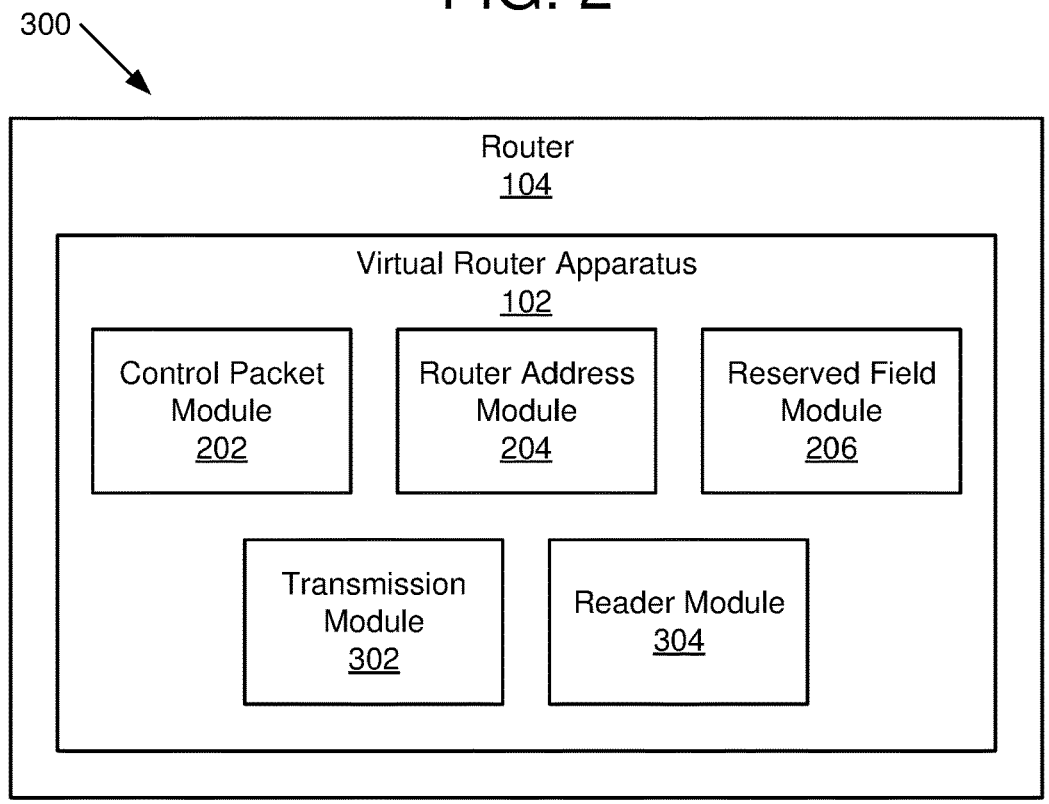
FIG. 3 is a schematic block diagram illustrating another apparatus for reducing the number of IP addresses used by VRRP, according to various embodiments.

FIG. 3 is a schematic block diagram illustrating another apparatus 300 for reducing the number of IP addresses used by VRRP. The apparatus 300 includes another virtual router apparatus 102 in a router 104 where the virtual router apparatus 102 includes a control packet module 202, a router address module 204, and a reserved field module 206, which are substantially similar to those described above in relation to the apparatus 200 of FIG. 2. The apparatus 300 includes a transmission module 302, and/or a reader module 304, which are described below. The apparatus 300, in some embodiments, may be implemented similar to the apparatus 200 of FIG. 2. In some embodiments, the apparatus 300 is located in the physical routers 104. In other embodiments, the transmission module 302 and/or the reader module 304 are located in the physical routers 104 while the other modules 202, 204, 206 are located elsewhere, such as in the network controller 116 or a host 110, 114.

The apparatus 300 includes, in some embodiments, a transmission module 302 configured to transmit the VRRP control packet to a physical router (e.g. 104*b*) of the physical routers 104 of the virtual router 106. In some embodiments, the transmission module 302 transmits the VRRP control packet to each physical router 104 of the virtual router 106. In other embodiments, the transmission module 302 transmits the VRRP control packet just to adjacent routers (e.g. 104b) of the physical routers 104 of the virtual router 106.

In some embodiments, the transmission module 302 transmits the VRRP control packet on a periodic basis. For example, where the Max Aver Int field is set to 1 second, the transmission module 302 transmits the VRRP control packet at a rate less than 1 second. In some embodiments, the transmission module 302 transmits the VRRP control packet at a rate much less than the Max Adver Int field so that multiple VRRP control packets must be lost before the physical router (e.g. 104a) transmitting the VRRP control packet is deemed failed.

The apparatus 300 includes, in some embodiments, a reader module 304 configured to read the reserved field of a received VRRP control packet and interpret the virtual router address(es) in the router address field of the VRRP header 400 (e.g. the IPvX address(es) field) as IPv4 addresses in response to the reserved field including the first value. In other embodiments, the reader module 304 also reads other fields of the VRRP header of a received VRRP control packet to determine the nature of the VRRP control packet, the version of the VRRP control packet, etc.

In some embodiments, the control packet module 202 of each physical router 104a, 104b creates a VRRP control packet. For example, each physical router 104 includes the virtual router apparatus 102 with the control packet module 202. Each VRRP control packet includes the IP address of the virtual router 106 in a router address field (e.g. the IPvX address(es) field) and the first value in the reserved field of the header. The transmission module 302 of each router 104a, 104b of the plurality of physical routers 104 transmits the VRRP control packet of the router to directly connected routers 104a, 104b of the plurality of physical routers 104 of the virtual router 106.

Advantageously, the apparatuses 200, 300 of FIGS. 2 and 3 provide a mechanism for establishing a virtual router 106 while only assigning an IPv4 IP address to the virtual router 106 and not assigning an IPv4 address to the physical routers 104 of the virtual router 106. Thus, the apparatuses 200, 300 save IPv4 address space.

Figure 5:
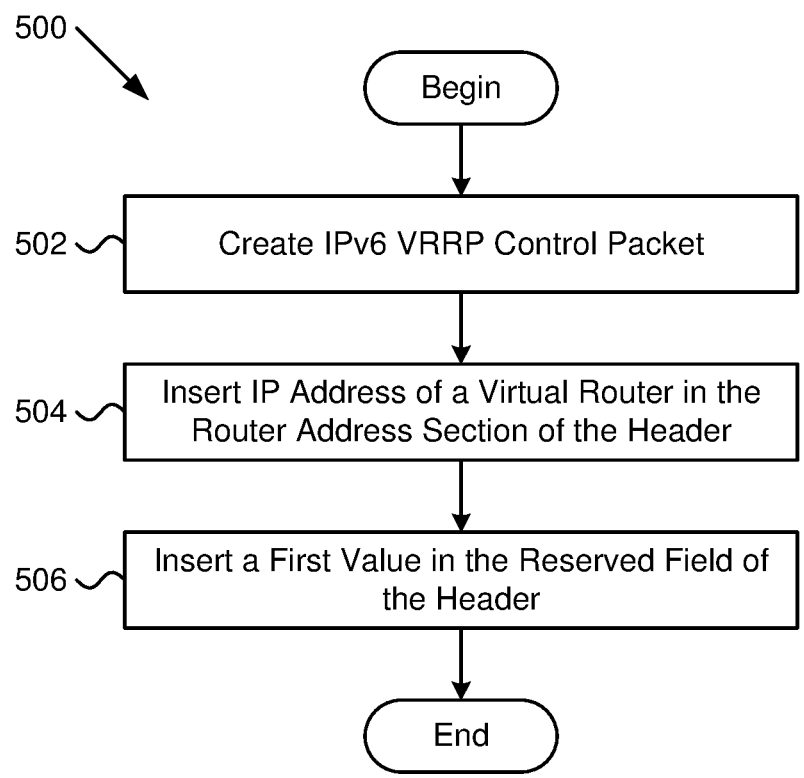
FIG. 5 is a schematic flow chart diagram illustrating a method for reducing the number of IP addresses used by VRRP, according to various embodiments.

FIG. 5 is a schematic flow chart diagram illustrating a method 500 for reducing the number of IP addresses used by VRRP, according to various embodiments. The method 500 begins and creates 502 a VRRP control packet at a router (e.g. 104a, 104b) of a plurality of physical routers 104 configured in parallel in a data pathway. The plurality of physical routers 104 are configured as a virtual router 106 and the VRRP control packet is configured as an IPv6 VRRP control packet. The method 500 inserts 504 an IP address of the virtual router 106 in a router address field (e.g. IPvX address(es) section) of a header of the VRRP control packet and the IP address is formatted as an IPv4 address. The method 500 inserts 506 a first value in a reserved field of the VRRP control packet, and the method 500 ends. The first value differs from a second value designated as a default value for the reserved field. The default value signifies that IP addresses in the router address field are formatted as IPv6 addresses for IPv6 VRRP control packets and the first value signifies that the IP addresses in the router address field are formatted as IPv4 addresses. In various embodiments, all or a portion of the method 500 is implemented using the control packet module 202, the router address module 204, and/or the reserved field module 206.

Figure 6:
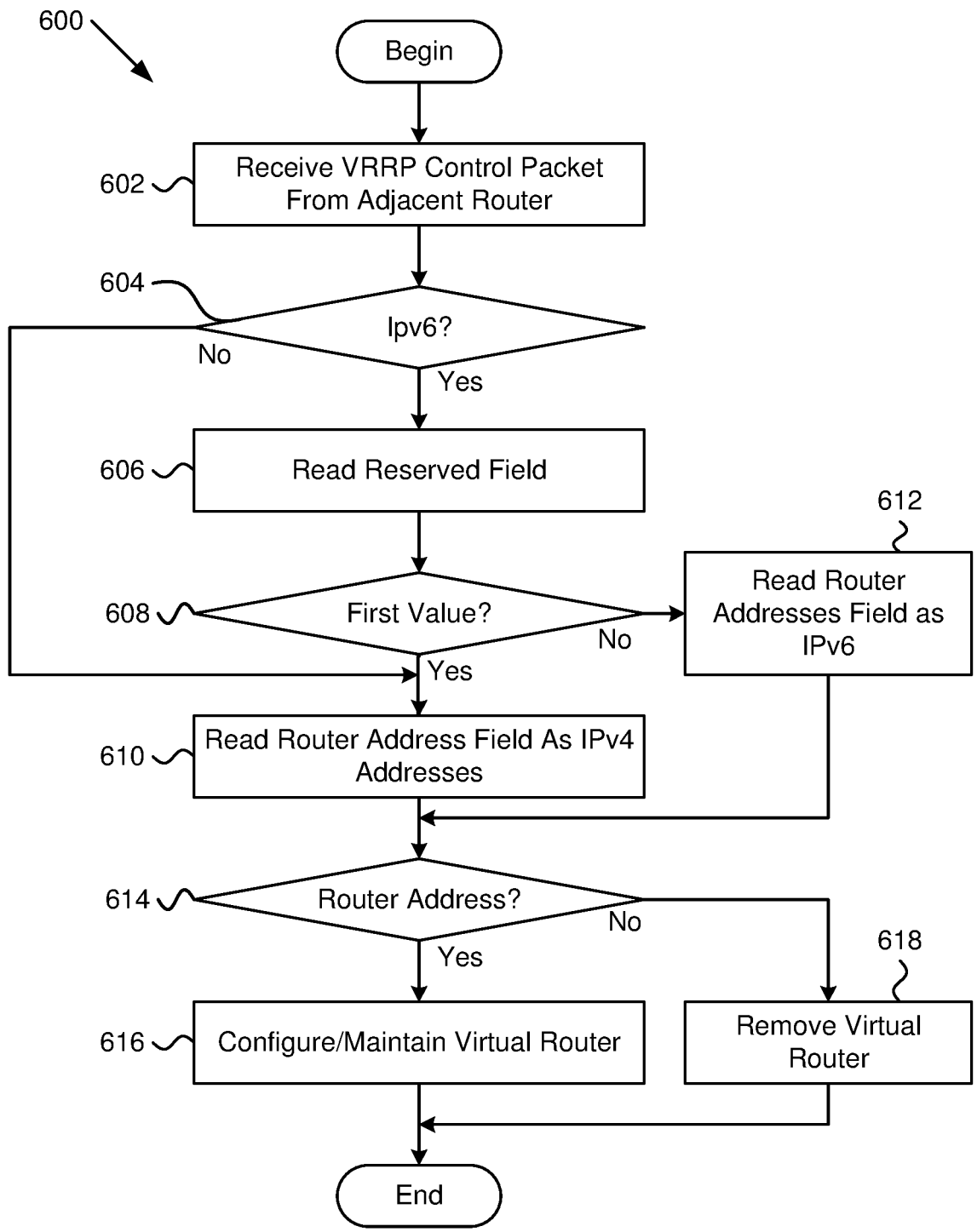
FIG. 6 is a schematic flow chart diagram illustrating a method for reading and interpreting VRRP control packets, according to various embodiments.

FIG. 6 is a schematic flow chart diagram illustrating a method 600 for reading and interpreting VRRP control packets, according to various embodiments. The method 600 begins and receives 602 a VRRP control packet from an adjacent router (e.g. 104a) and determines 604 if the VRRP control packet is an IPv6 control packet. Typically, the method 600 determines 604 if the VRRP control packet is an IPv6 packet or an IPv4 packet by reading the IPv4 Fields or IPv6 Fields at the top of the VRRP control packet header, as depicted in FIG. 4, and where addresses are formatted as IPv6 addresses, the method 600 determines 604 that the VRRP control packet is an IPv6 control packet, meaning that IP addresses are in the IPv6 format.

If the method 600 determines 604 that the VRRP control packet is an IPv6 control packet, the method 600 reads 606 the reserved field of the control packet header and determines 608 if the reserved field includes a first value or a second value. The second value is a default value, which is typically zeros and the first value is anything other than all zeros in the reserved field. If the method 600 determines 608 that the reserved field has the first value, the method 600 reads 610 the router address field (e.g. IPvX adresss(es) field in FIG. 4) as IPv4 addresses. If the method 600 determines 604 that the VRRP control packet is not an IPv6 control packet, the method 600 reads 610 the router address field (e.g. IPvX adresss(es) field in FIG. 4) as IPv4 addresses. If the method 600 determines 608 that the reserved field is not the first value, meaning that the reserved field is the second value, the method 600 reads 612 the router address field as IPv6 addresses.

The method 600 determines 614 if there are router IP addresses in the router address field. If the method 600 determines 614 that there are router IP addresses in the router address field, the method 600 configures or maintains 616 a virtual router 106, and the method 600 ends. If the method 600 determines 614 that there are no router IP addresses in the router address field, the method 600 removes 618 the configuration of the virtual router 106, and the method 600 ends. For example, the method 600 may remove a virtual router IP address to remove the virtual router 106. In various embodiments, all or a portion of the method 600 is implemented using the control packet module 202, the router address module 204, the reserved field module 206, the transmission module 302, and/or the reader module 304.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
   creating a Virtual Router Redundancy Protocol ("VRRP") control packet at a router of a plurality of physical routers configured in parallel in a data pathway, the plurality of physical routers configured as a virtual router, the VRRP control packet configured as an Internet Protocol ("IP") version 6 ("IPv6") VRRP control packet;
   inserting an IP address of the virtual router in a router address field of a header of the VRRP control packet, the IP address formatted as an IP version 4 ("IPv4") address;
   inserting a first value in a reserved field of the VRRP control packet, the first value differing from a second value designated as a default value for the reserved field, wherein the default value signifies that IP addresses in the router address field are formatted as IPv6 addresses for IPv6 VRRP control packets and wherein the first value signifies that the IP addresses in the router address field are formatted as IPv4 addresses; and creating a VRRP control packet at each router of the plurality of physical routers, wherein each VRRP control packet comprises the IP address of the virtual router in the router address field and the first value in the reserved field of the header, wherein each router of the plurality of physical routers transmits the VRRP control packet of the router to directly connected routers of the plurality of physical routers of the virtual router.

2. The method of claim 1, wherein transmitting the VRRP control packet to an adjacent router of the plurality of physical routers forming the virtual router further comprises retransmitting the VRRP control packet periodically.

3. The method of claim 1, wherein the router of the plurality of physical routers reads the IP address of the virtual router in the router address field as an IPv4 address in response to the reserved field comprising the first value.

4. The method of claim 1, wherein each router of the plurality of physical routers has an IPv6 address.

5. The method of claim 1, wherein each router of the plurality of physical routers and the virtual router are in a same subnet.

6. The method of claim 1, wherein the second value comprises a logic 0 for each bit in the reserved field and the first value comprises a logic 1 for at least one bit in the reserved field.

7. The method of claim 1, wherein a router of the plurality of physical routers transmits the VRRP control packet to each directly connected router using a link-local address.

8. The method of claim 1, wherein each of the plurality of physical routers are not assigned an IP address.

9. An apparatus comprising:
a processor; and
a memory storing code, the code being executable by the processor to perform operations comprising:
creating a Virtual Router Redundancy Protocol ("VRRP") control packet at a router of a plurality of physical routers configured in parallel in a data pathway, the plurality of physical routers configured as a virtual router, the VRRP control packet configured as an Internet Protocol ("IP") version 6 ("IPv6") VRRP control packet;
inserting an IP address of the virtual router in a router address field of a header of the VRRP control packet, the IP address formatted as an IP version 4 ("IPv4") address;
inserting a first value in a reserved field of the VRRP control packet, the first value differing from a second value designated as a default value for the reserved field, wherein the default value signifies that IP addresses in the router address field are formatted as IPv6 addresses for IPv6 VRRP control packets and wherein the first value signifies that the IP addresses in the router address field are formatted as IPv4 addresses; and
creating a VRRP control packet at each router of the plurality of physical routers, wherein each VRRP control packet comprises the IP address of the virtual router in the router address field and the first value in the reserved field of the header, wherein each router of the plurality of physical routers transmits the VRRP control packet of the router to directly connected routers of the plurality of physical routers of the virtual router.

10. The apparatus of claim 9, wherein the router of the plurality of physical routers reads the IP address of the virtual router in the router address field as an IPv4 address in response to the reserved field comprising the first value.

11. The apparatus of claim 9, wherein each router of the plurality of physical routers has an IPv6 address and wherein each router of the plurality of physical routers and the virtual router are in a same subnet.

12. The apparatus of claim 9, wherein the operations comprising transmitting the VRRP control packet to an adjacent router of the plurality of physical routers forming the virtual router further comprise retransmitting the VRRP control packet periodically.

13. The apparatus of claim 9, wherein the second value comprises a logic 0 for each bit in the reserved field and the first value comprises a logic 1 for at least one bit in the reserved field.

14. The apparatus of claim 9, wherein a router of the plurality of physical routers transmits the VRRP control packet to each directly connected router using a link-local address.

15. The apparatus of claim 9, wherein each of the plurality of physical routers are not assigned an IP address.

16. A program product comprising a non-volatile computer readable storage medium storing code, the code being configured to be executable by a processor to perform operations comprising:
creating a Virtual Router Redundancy Protocol ("VRRP") control packet at a router of a plurality of physical routers configured in parallel in a data pathway, the plurality of physical routers configured as a virtual router, the VRRP control packet configured as an Internet Protocol ("IP") version 6 ("IPv6") VRRP control packet;
inserting an IP address of the virtual router in a router address field of a header of the VRRP control packet, the IP address formatted as an IP version 4 ("IPv4") address;
inserting a first value in a reserved field of the VRRP control packet, the first value differing from a second value designated as a default value for the reserved field, wherein the default value signifies that IP addresses in the router address field are formatted as IPv6 addresses for IPv6 VRRP control packets and wherein the first value signifies that the IP addresses in the router address field are formatted as IPv4 addresses; and
creating a VRRP control packet at each router of the plurality of physical routers, wherein each VRRP control packet comprises the IP address of the virtual router in the router address field and the first value in the reserved field of the header, wherein each router of the plurality of physical routers transmits the VRRP control packet of the router to directly connected routers of the plurality of physical routers of the virtual router.

17. The program product of claim 16, wherein the router of the plurality of physical routers reads the IP address of the virtual router in the router address field as an IPv4 address in response to the reserved field comprising the first value.

18. The program product of claim 16, wherein transmitting the VRRP control packet to an adjacent router of the plurality of physical routers forming the virtual router further comprises retransmitting the VRRP control packet periodically.

19. The program product of claim 16, wherein the router of the plurality of physical routers reads the IP address of the virtual router in the router address field as an IPv4 address in response to the reserved field comprising the first value.

20. The program product of claim 16, wherein each router of the plurality of physical routers has an IPv6 address and/or wherein each router of the plurality of physical routers and the virtual router are in a same subnet.

* * * * *